United States Patent [19]

Kastura et al.

[11] 4,277,772
[45] Jul. 7, 1981

[54] MOTOR VEHICLE DIAGNOSTIC AND MONITORING SYSTEM

[75] Inventors: John L. Kastura; David O. Enyart, both of Kokomo, Ind.

[73] Assignee: General Motors Corporation, Detroit, Mich.

[21] Appl. No.: 160,152

[22] Filed: Jun. 17, 1980

[51] Int. Cl.³ ............................................. G08B 19/00
[52] U.S. Cl. ................................. 340/52 F; 340/27 R; 340/52 R; 340/870.09
[58] Field of Search ................. 340/27 R, 52 R, 52 F, 340/177 R, 178, 181; 307/10 R; 180/271

[56] References Cited

U.S. PATENT DOCUMENTS 3,866,166  2/1975  Kerscher et al. .................. 340/52 F
3,949,356  4/1976  Fuzzell et al. ..................... 340/52 F Primary Examiner—Alvin H. Waring
Attorney, Agent, or Firm—Howard N. Conkey

[57] ABSTRACT

A diagnostic and warning system for a motor vehicle monitors the condition of a number of preselected parameters. When the condition of a parameter is representative of a fault condition, the system energizes a malfunction lamp in the vehicle compartment during the period of the detected fault and the particular fault detected is stored in a nonvolatile memory. A single counter is employed which functions to filter intermittent malfunctions for each of the monitored parameters and which imposes a minimum time duration for energization of the malfunction lamp.

3 Claims, 12 Drawing Figures

MOTOR VEHICLE DIAGNOSTIC AND MONITORING SYSTEM

This invention relates to a diagnostic and monitoring system for a motor vehicle.

Numerous diagnostic and warning systems have been proposed that monitor the conditions of more than one vehicle or control system operating parameter and provide a warning of a detected fault condition. One of these systems described in copending application Ser. No. 070,885 filed Aug. 29, 1979 and assigned to the assignee of this invention further stores in memory the particular faults detected.

It is generally desirable to filter intermittent fault conditions in a warning system to avoid indication of and storing a code representative of a fault condition which exists only momentarily or which may have been a false malfunction. In a system in which a number of parameters are monitored where the parameters may be faulted simultaneously, it would typically be necessary to provide a filter for each of the monitored parameters. However, this would require a large amount of circuitry and would increase system costs. Alternatively, in a system using a single filter and where the faulted parameters are stored in memory, a second fault detected during a first fault may be stored in memory without regard to filtering. However, this may result in storing false momentarily detected fault conditions in memory.

It is the general object of this invention to provide an improved diagnostic and warning system for motor vehicle and motor vehicle engine control systems.

It is another object of this invention to provide for a vehicle diagnostic and warning system employing a single counter effective to provide filtering of the detected fault conditions of each of a number of monitored parameters.

It is another object of this invention to provide a vehicle diagnostic and warning system employing a single filter for filtering intermittent malfunctions for each of the monitored parameters and which further provides for maintaining a warning lamp illuminated for a minimum time period after a detected fault condition.

The invention may be best understood by reference to the following description of a preferred embodiment and the drawings in which.

Figure 2:
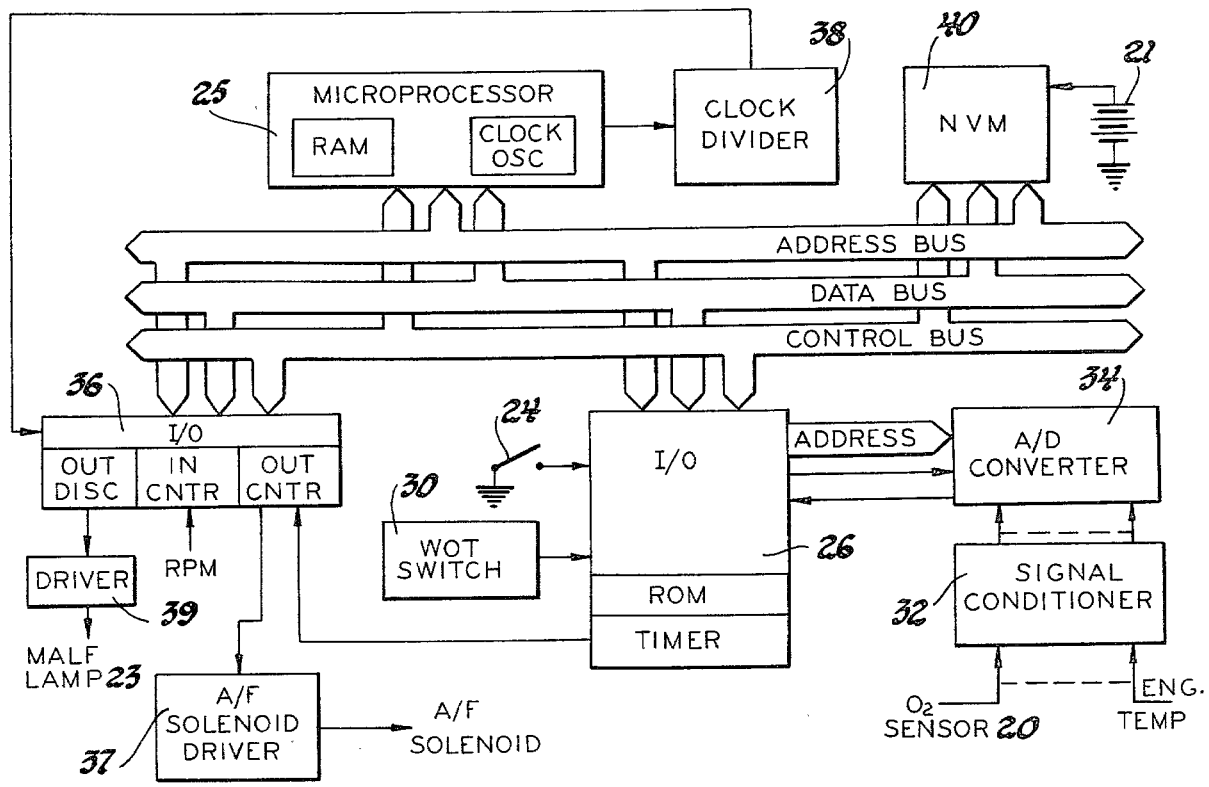
FIG. 2 illustrates a digital computer for controlling the air and fuel mixture supplied to the engine of FIG. 1 and which provides the indication and storage of fault conditions in accord with the principles of this invention.
Figure 8:
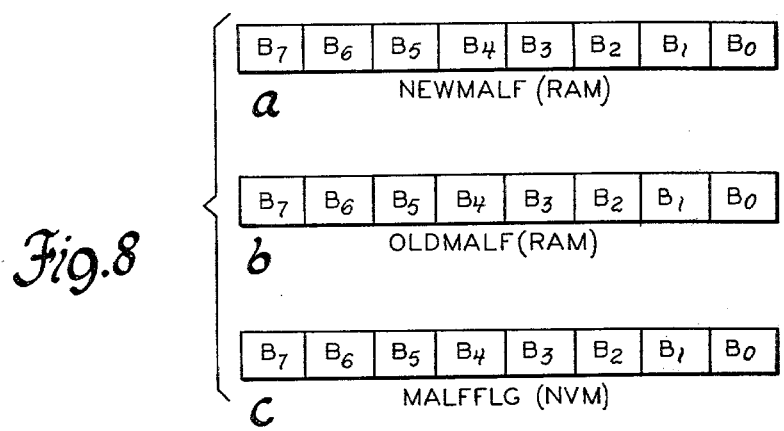
Figure 9A:
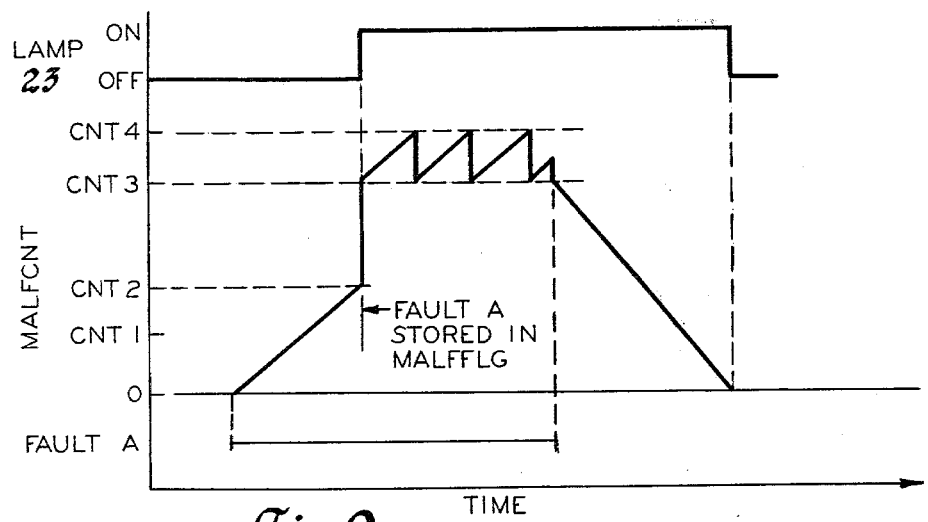
Figure 9B:
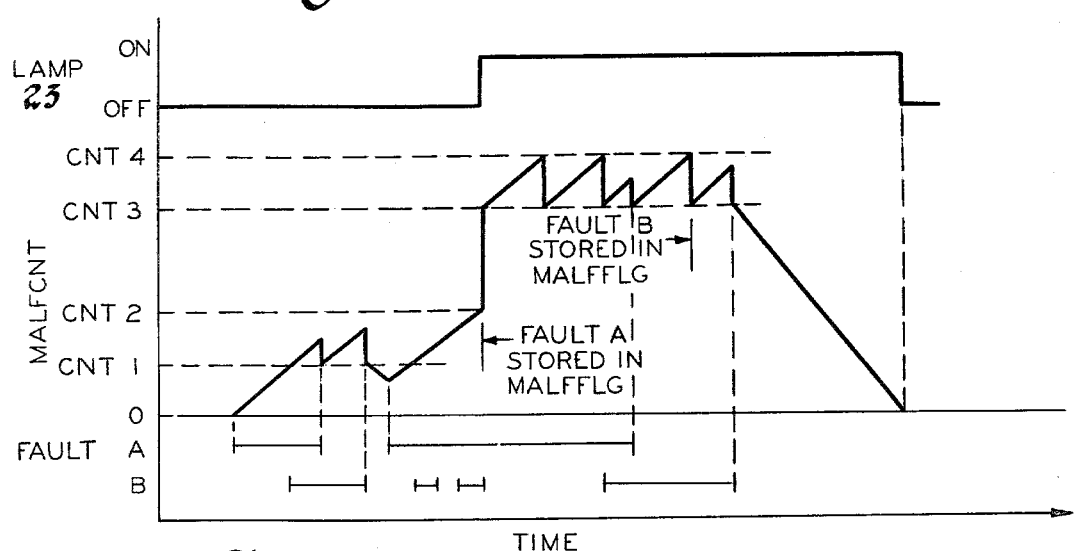

FIGS. 4 thru 7 are diagrams illustrative of the operation of the digital computer of FIG. 2 incorporating the diagnostic and warning principles of this invention;

FIGS. 8a thru 8c are diagrams illustrative of the memory locations in the digital computer of FIG. 2 for storing the occurrence of detected fault conditions; and FIGS. 9a and 9b are graphs illustrating the operation of the diagnostic and warning system of this invention.

Figure 1:
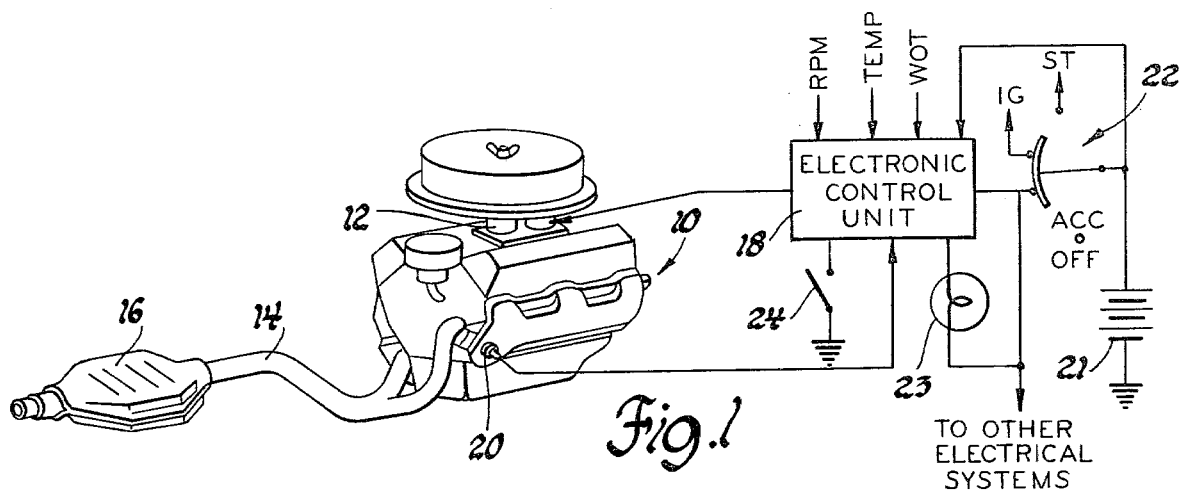
FIG. 1 illustrates an internal combustion engine air/fuel ratio control system incorporating the diagnostic and warning system of this invention.

Referring to FIG. 1, there is illustrated the warning and diagnostic system of this invention used in conjunction with an engine air and fuel mixture controller for a vehicle internal combustion engine 10. The engine 10 is supplied with a controlled mixture of fuel and air by a carburetor 12. The combustion byproducts from the engine 10 are exhausted to the atmosphere through an exhaust conduit 14 which includes a three-way catalytic converter 16.

The air/fuel ratio of the mixture supplied by the carburetor 12 is selectably controlled either open loop or closed loop by means of an electronic control unit 18. During open loop control, the electronic control unit 18 is responsive to predetermined engine operating parameters to generate an open loop control signal to adjust the air/fuel ratio of the mixture supplied by the carburetor 12 in accord with a predetermined schedule. When the conditions exist for closed loop operation, the electronic control unit 18 is responsive to the output of a conventional air/fuel ratio sensor 20 positioned at the discharge point of one of the exhaust manifolds of the engine 10 and which senses the exhaust discharge therefrom to generate a closed loop control signal for adjusting the carburetor 12 to obtain a predetermined air/fuel ratio such as the stoichiometric ratio. The carburetor 12 includes an air/fuel ratio adjustment device that is responsive to the open loop and closed loop control signal outputs of the electronic control unit 18 to adjust the air/fuel ratio of the mixture supplied by the carburetor 12.

In the present embodiment, the control signal output of the electronic control unit 18 takes the form of a pulse width modulated signal at a constant frequency thereby forming a duty cycle modulated control signal. This signal is coupled to the carburetor 12 to effect the adjustment of the air/fuel ratio supplied by the fuel metering circuits therein. In this embodiment, a low duty cycle output of the electronic control unit 18 provides for an enrichment of the mixture supplied by the carburetor 12 while a high duty cycle value is effective to lean the mixture.

An example of a carburetor 12 with a controller responsive to a duty cycle signal for adjusting the mixture supplied by its fuel metering circuits is illustrated in the U.S. Pat. No. 4,178,332 which issued on Dec. 11, 1979, and which is assigned to the assignee of this invention. In this form of carburetor, the duty cycle modulated control signal is applied to a solenoid which adjusts elements in the fuel metering circuits to provide for the air/fuel ratio adjustment.

The electronic control unit 18 also receives inputs from conventional sensors including an engine speed sensor providing a speed signal RPM, an engine coolant temperature sensor providing a temperature signal TEMP and a wide open throttle signal WOT. The voltage from the vehicle battery 21 is applied directly to the electronic control unit 18 and also thereto through the accessory contacts of a conventional vehicle ignition switch 22 which is manually operable to energize the engine starter motor circuit (not shown). The switch 22 also energizes the ignition system in the start and run positions, the latter being illustrated.

Figure 3:
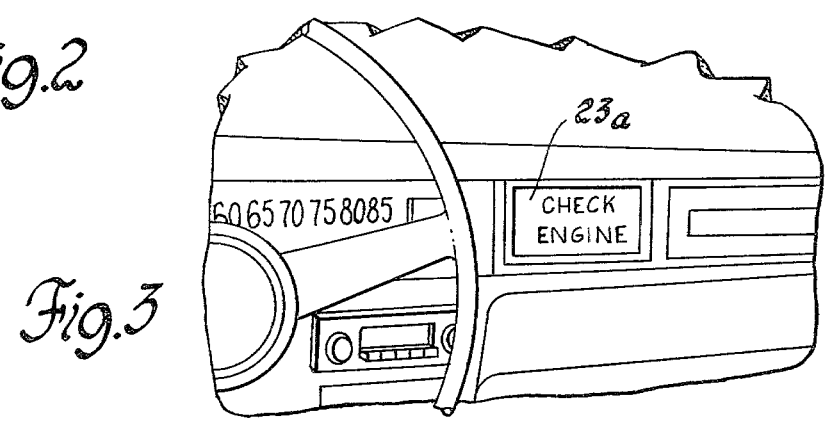
FIG. 3 is a diagram illustrating the warning provided to a vehicle operator in an engine compartment in response to a detected fault condition.

The electronic control unit 18 monitors various operating parameters of the engine 10 and provides a warning indication during the period of a detected fault condition by grounding a malfunction lamp 23 which is coupled to the vehicle battery 21 through the accessory contact of the ignition switch 22. Illustrative of the parameters monitored by the electronic control unit 18 are the oxygen sensor circuit and the engine coolant temperature sensor circuit. Additional parameters may include engine speed sensor circuit continuity, wide open throttle switch circuit continuity and carburetor solenoid circuit continuity. The malfunction lamp 23 illuminates a "check engine" display 23a in the vehicle driving compartment as illustrated in FIG. 3.

The electronic control unit 18 stores each of the detected fault conditions in a nonvolatile memory to be described and which is maintained energized by the vehicle battery 21 even during periods of vehicle engine shutdown when the ignition switch 22 is in the OFF position. The electronic control unit 18 functions to provide an indication of the specific faults that have occurred and were stored in memory in response to a diagnostic interrogation signal in the form of a ground signal provided by a diagnostic interrogation switch 24. When the diagnostic interrogation switch 24 is closed, the electronic control unit 18 flashes the malfunction lamp 23 in accord with a predetermined code to indicate the fault conditions stored in the nonvolatile memory. The diagnostic interrogation switch 24 may take the form of a diagnostic lead that is grounded to the engine 10 by a mechanic to generate the diagnostic interrogation signal.

Referring to FIG. 2, the electronic control unit 18 in the present embodiment takes the form of a digital computer that provides a pulse width modulated signal at a constant frequency to the carburetor 12 to effect adjustment of the air/fuel ratio. The digital computer further provides a ground signal to the malfunction lamp 23 to provide an indication of a detected fault condition during the period of the fault condition and further provides for the flashing of the malfunction lamp 23 in response to a diagnostic interrogation signal provided by the switch 24 of FIG. 1 to indicate the malfunction stored in the nonvolatile memory in the electronic control unit 18.

The digital system includes a microprocessor 25 that controls the operation of the carburetor 12 and provides for the diagnostic and warning functions of this invention by executing an operating program stored in an external read only memory (ROM). The microprocessor 25 may take the form of a combination module which includes a random access memory (RAM) and a clock oscillator in addition to the conventional counters, registers, accumulators, flag flip flops, etc., such as a Motorola Microprocessor MC-6802. Alternatively, the microprocessor 25 may take the form of a microprocessor utilizing an external RAM and clock oscillator.

The microprocessor 25 controls the carburetor 12 and the malfunction lamp 23 by executing an operating program stored in a ROM section of a combination module 26. The combination module 26 also includes an input/output interface and a programmable timer. The combination module 26 may take the form of a Motorola MC-6846 combination module. Alternatively, the digital system may include separate input/output interface modules in addition to an external ROM and timer. The input conditions upon which open and closed loop of air/fuel ratio are based and the diagnostic interrogation signal from the diagnostic interrogation switch 24 are provided to the input/output interface of the combination circuit 26. The discrete inputs such as the output signal WOT of a throttle switch 30 and the diagnostic interrogation signal provided by the diagnostic interrogation switch 24 are coupled to discrete inputs of the input/output interface of the combination circuit 26.

The analog signals including the air/fuel ratio signal from the sensor 20 and the engine coolant temperature signal TEMP are provided to a signal conditioner 32 whose outputs are coupled to an analog-to-digital converter-multiplexer 34. The particular analog condition sampled and converted is controlled by the microprocessor 25 in accord with the operating program via the address lines from the input/output interface of the combination circuit 26. Upon command, the addressed condition is converted to digital form and supplied to the input/output interface of the combination circuit 26 and then stored in ROM designated memory locations in the RAM.

The duty cycle modulated output for controlling the air/fuel solenoid in the carburetor 12 is provided by an output counter section of an input/output interface circuit 36. The output pulses to the carburetor 12 are provided via a conventional solenoid driver circuit 37. The output counter section receives a clock signal from a clock divider 38 and a 10 hz signal from the timer section of the combination circuit 26. In general, the output counter section of the circuit 36 may include a register into which a binary number representative of the desired pulse width is inserted. Thereafter at the frequency of the 10 hz signal from the timer section of the circuit 26, the number is gated into a down counter which is clocked by the output of the clock divider 38 with the output pulse of the output counter section having a duration equal to the time required for the down counter to be counted down to zero. In this respect, the output pulse may be provided by a flip flop set when the number in the register is gated into the down counter and reset by a carry signal from the down counter when the number is counted to zero.

The circuit 36 also includes an input counter section which receives the speed pulses from an engine speed transducer or the engine distributor that gate clock pulses to a counter to provide an indication of engine speed. An output discrete section of the circuit 36 energizes the malfunction lamp 23 to indicate the occurrence of a fault and, in response to a diagnostic interrogation signal, flashes the malfunction lamp 23 via a driver circuit 39, which may take the form of a Darlington transistor energized to ground the malfunction lamp 23 to indicate stored malfunctions. The output discrete section may include, for example, a flip flop which is set and reset in accord with the desired energization and deenergization periods of the malfunction lamp 23.

While a single circuit 36 is illustrated as having an output counter section, input counter section and output discrete section, each of those sections may take the form of separate independent circuits.

The system further includes a nonvolatile memory 40 having memory locations into which data can be stored and from which data may be retrieved. In this embodiment, the nonvolatile memory 40 takes the form of a RAM having power continuously applied thereto directly from the vehicle battery and bypassing the engine ignition switch 22 so that the contents therein are retained in memory during the shutdown mode of the engine 10 when the ignition switch 22 is in its OFF position.

Alternatively, the nonvolatile memory 40 may take the form of a memory having the capability of retaining its contents in memory without the application of power thereto.

The microprocessor 25, the combination module 26, the input/output interface circuit 36 and the nonvolatile memory 40 are interconnected by an address bus, a data bus and a control bus. The microprocessor 25 accesses the various circuits and memory locations in the ROM, the RAM and the nonvolatile memory 40 via the address bus. Information is transmitted between circuits via the data bus and the control bus includes lines such as read/write lines, reset lines, clock lines, etc.

As previously indicated, the microprocessor 25 reads data and controls the operation of the carburetor 12 and the malfunction lamp 23 by execution of its operating program as provided in the ROM section of the combination circuit 26. Under control of the program, various input signals are read and stored in ROM designated locations in the RAM section of the microprocessor 25 and the operations are performed for controlling the air and fuel mixture supplied by the carburetor 12 and for performing the diagnostic and monitoring functions.

Figure 4:
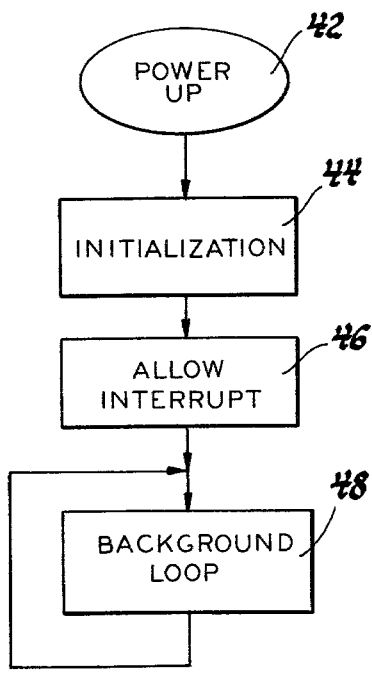

Referring to FIG. 4, when the ignition switch 22 is first operated to start the vehicle engine 10 and to apply power to the various circuits including the electronic control unit 18, the computer program is initiated at point 42 when power is first applied and proceeds to step 44. At this step, the computer provides for initialization of the system. For example, at this step, system initial values stored in the ROM are entered into ROM designated locations in the RAM in the microprocessor 25 and counters, flag flip flops and timers are initialized.

After the initialization step 44, the program proceeds to step 46 wherein the program allows interrupt routines to occur. For example, this may be accomplished by resetting the interrupt mask bit in the microprocessor condition code register. After step 46, the program shifts to a background loop 48 which is continuously repeated. The background loop 48 may include control functions such as EGR control in addition to the diagnostic and warning routines of this invention.

The reading and storing of input data and the open or closed loop adjustment of the carburetor 12 are controlled during an interrupt routine which interrupts the background loop 48 and which executes a routine stored in the ROM to adjust the carburetor in accord with the inputs including the oxygen sensor 20. For example, the background loop 48 may be interrupted at 100 millisecond intervals by an interrupt request provided by the timer section of the circuit 26 for the execution of a routine to read and store input data and to determine and issue to the carburetor solenoid driver 37 the carburetor control pulse width in accord with the sensed engine operating conditions. After the execution of the interrupt routine, the program then returns to the background loop 48 which is then continuously executed until the next 100 millisecond interrupt. The specific interrupt routine for reading and storing input data including the output of the sensor 20, engine temperature, engine speed, throttle position and the state of the diagnostic interrogation switch 24 and for adjusting the carburetor 12 in open or closed loop fashion may take the form of the routine illustrated in Applicants' copending application Ser. No. 070,885 filed on Aug. 29, 1979, assigned to the assignee of this invention and to which reference may be made for specific details.

Figure 5:
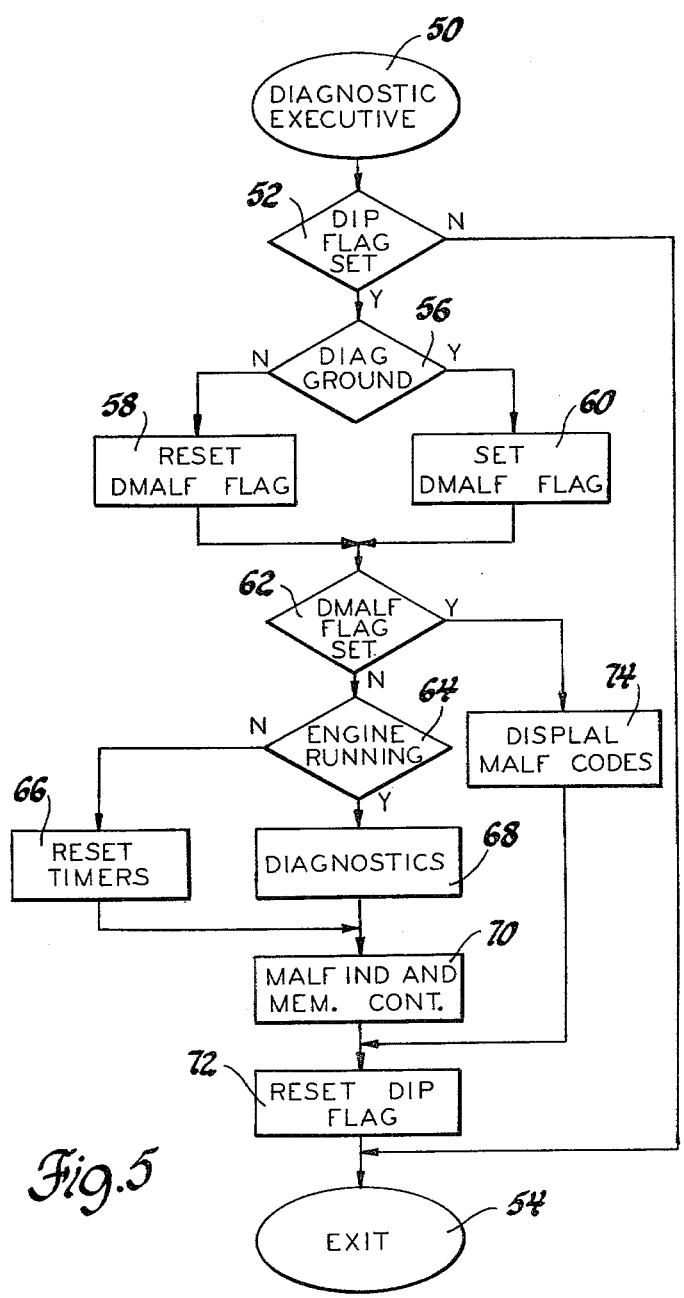

Referring to FIG. 5, the diagnostic executive routine performed in the background loop 48 of FIG. 4 is illustrated. The diagnostic executive routine is entered at step 50 and proceeds to a decision point 52 where the state of a display in progress (DIP) flag in the microprocessor 25 is sampled. This flag is set during each of the aforementioned 100 millisecond interrupt routines. A set condition of this flag indicates that the diagnostic executive routine of FIG. 5 has not been executed since the last 100 millisecond interrupt. If the DIP flag is reset indicating that the diagnostic executive routine has been executed since the last 100 millisecond interrupt, the program bypasses the diagnostic executive routine and exits at point 54. In this manner, the DIP flag operates to limit execution of the diagnostic executive to once each 100 millisecond period.

If the DIP flag is set, the program proceeds to a decision point 56 where the state of the diagnostic interrogation switch 24 stored during the interrupt routine is sampled. If the diagnostic interrogation switch 24 is open, the program proceeds to step 58 where a display malfunction flag is reset. If, however, the diagnostic interrogation switch 24 is closed thereby generating a diagnostic interrogation signal commanding a readout of the fault conditions stored in the nonvolatile memory 40, the program proceeds from the decision point 56 to step 60 where the display malfunction flag is set.

From the steps 58 and 60, the program proceeds to decision point 62 where the state of the display malfunction flag is sampled. If the display malfunction flag is reset indicating the diagnostic interrogation switch 24 is open, the program proceeds to a decision point 64 where it is determined if the vehicle engine is running. If the engine is not running, the program proceeds to step 66 where the various diagnostic counters timing durations of certain events are all reset. If, however, the engine is running, the program proceeds from decision point 64 to point 68 where a diagnostics routine is executed. This routine will be described with reference to FIG. 6.

From the diagnostics routine 68, the program proceeds to step 70 where a malfunction indication and memory control routine including the principles of this invention is executed. During this routine, the malfunction lamp 23 is energized during the period of a detected fault condition and the detected fault conditions are stored in the nonvolatile memory 40. Following step 70, the program proceeds to step 72 where the DIP flag is reset to indicate that the diagnostic executive routine has been executed during the period since the last 100 millisecond interrupt. Thereafter, at step 52, the program bypasses the diagnostic executive routine until the DIP flag is again set during execution of the next 100 millisecond interrupt routine.

If at decision point 62 it is determined that the display malfunction flag was set at step 60 indicating that the diagnostic interrogation switch 24 is closed to supply a diagnostic interrogation signal to the electronic control unit 18, the program proceeds to the step 74 where a display malfunction code routine is executed wherein the malfunction lamp 23 is flashed in accord with predetermined codes to provide an indication of each of the detected fault conditions stored in the nonvolatile memory 40. In this respect, the memory locations in the nonvolatile memory 40 at which the fault conditions are stored are sequentially sampled and when a stored fault condition is detected, the malfunction lamp 23 is flashed with a code representative of that fault condition. For example, a particular fault condition stored in the nonvolatile memory may be assigned the code 14. To indicate this fault condition, the malfunction lamp 23 is first flashed once followed by a pause after which the malfunction lamp 23 is flashed 4 times thereby representing the code 14. By observing the lamp 23, the vehicle operator or mechanic is informed of the fault that has occurred. In this manner, the program sequentially flashes the codes of all of the malfunctions or fault conditions stored in the nonvolatile memory 40.

Referring to FIG. 8, there is illustrated the memory locations in the RAM section of the microprocessor 25 and the nonvolatile memory 40 for storing information relative to faults that occur. Each memory location is comprised of 8 bits with the corresponding bit in each memory location representing a particular condition being monitored relative to the sensing of fault conditions. For example, FIG. 8a is representative of a memory location or register hereinafter referred to as NEWMALF in the RAM having 8 bits where malfunctions detected during the present 100 millisecond period are stored. FIG. 8b is representative of a memory location or register hereinafter referred to as OLDMALF in the RAM having 8 bits where the malfunctions stored in the corresponding bits in the memory location NEWMALF are stored. FIG. 8c is illustrative of a memory location hereinafter referred to as MALFFLG in the nonvolatile memory 40 having 8 bits where the malfunctions stored in the memory location OLDMALF are stored after predetermined time criteria have been met and thereafter retained in memory during shutdown periods of the vehicle engine. In each of the memory locations NEWMALF, OLDMALF and MALFFLG, each corresponding bit is associated with a particular condition or parameter being monitored. For example, in the present embodiment the least significant bit $b_0$ in each of the memory locations is associated with a shorted coolant temperature sensor circuit, the bit $b_1$ is associated with an open circuit coolant temperature sensor circuit and the bits $b_2$ and $b_3$ are associated with the oxygen sensor circuit. Each of the remaining bits $b_4$ thru $b_7$ are each assigned to other desired engine conditions being monitored and whose fault conditions are to be stored. If more than 8 parameters are being monitored, additional memory locations may be used. Each bit in the memory locations NEWMALF and OLDMALF in the RAM and in the memory location MALFFLG in the nonvolatile memory 40 is initially reset to logic zero representing an absence of fault conditions and is set to a logic 1 when the parameter corresponding thereto is representative of a fault condition.

Figure 6:
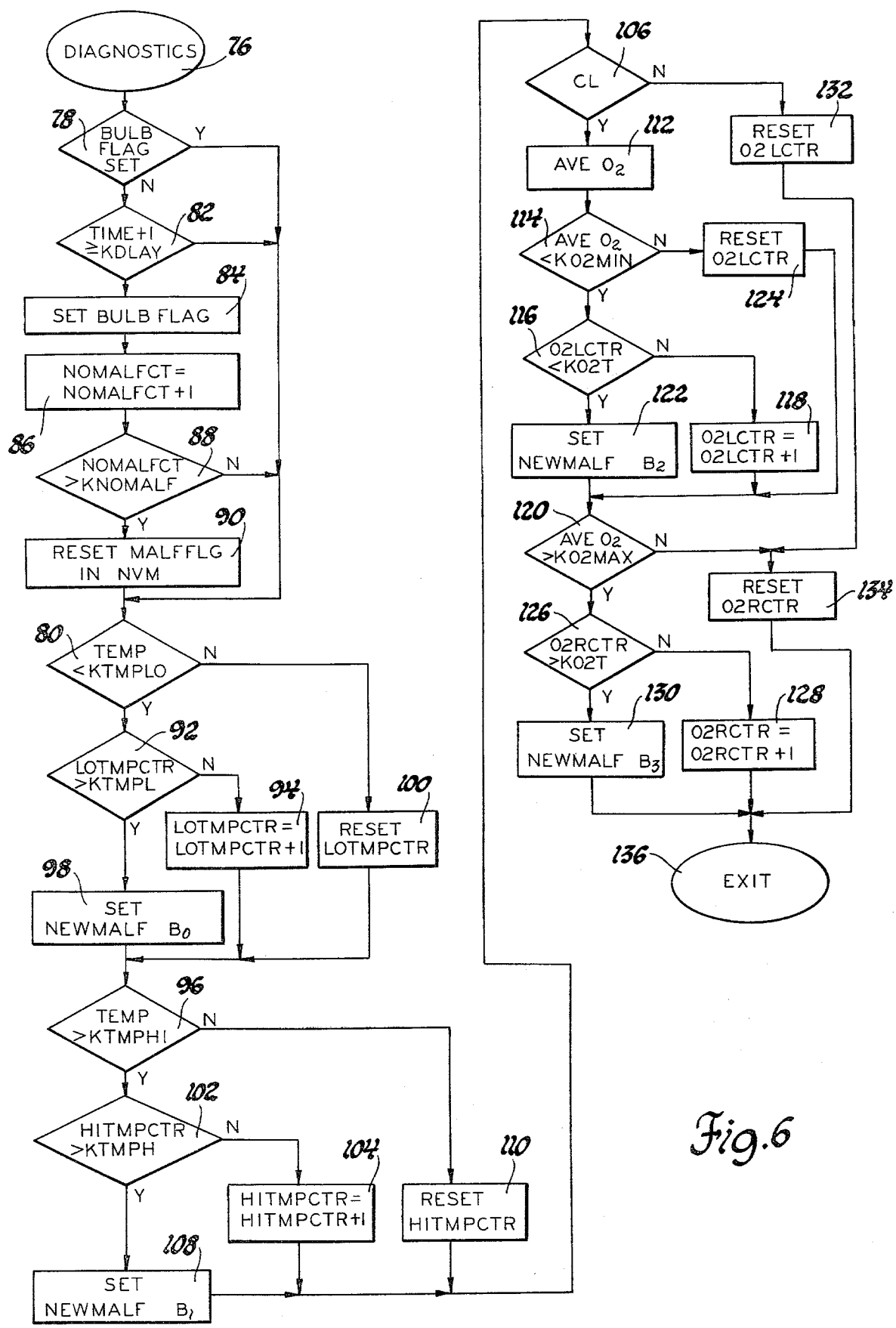

Referring to FIG. 6, the diagnostics routine 68 is illustrated wherein the operating conditions of predetermined parameters of the system of FIG. 1 are sampled and compared with limits representative of fault conditions. For purposes of illustrating the invention, it is assumed that the diagnostics routine is effective to monitor the continuity of the temperature sensing circuit and failed rich and failed lean conditions in the oxygen sensor circuit. It is understood that numerous other circuits or parameters may be checked for faulted conditions including pressure and speed sensor circuits and the carburetor A/F ratio control solenoid.

In addition to detecting the occurrence of a parameter being outside predetermined limits, the diagnostic routine illustrated in FIG. 6 functions to enable the energizing of the malfunction lamp 23 for test purposes for a predetermined time period after the engine is first started and to erase the faults stored in the nonvolatile memory 40 after a predetermined time period has lapsed since the last detected fault condition.

The program enters the diagnostics routine 68 at step 76 and proceeds to a decision point 78 where the state of a bulb flag in the microprocessor 25 is sampled. If the bulb flag is set, it represents that the malfunction lamp 23 has been energized for the predetermined test period after the engine has been started. If the flag is set, the program proceeds to a decision point 80. However, if the bulb flag is reset indicating that the time period has not lapsed since the engine has started, the program cycle proceeds to a decision point 82 where a bulb flag time counter is incremented and compared with a calibration value KDLAY in the ROM representing the time duration that the malfunction lamp 23 is to be energized after engine start. If the time has not expired, the program cycle proceeds to the decision point 80. However, if at decision point 82 it is determined that the time period has expired, the program proceeds to step 84 where the bulb flag is set so that a step 78 during the next execution of the diagnostics routine, the program proceeds directly to the decision point 80.

After step 84 the program cycle proceeds to a step 86 where a no-malfunction count NOMALFCT stored in a memory location in the nonvolatile RAM 40 is incremented. This count represents the time since the last detected fault condition. While in another embodiment a real time counter may be employed, in this embodiment, time is represented by the number of times that the vehicle engine is started. Since the program proceeds from the decision point 82 to the step 86 only once after each engine start, the no-malfunction count NOMALFCT is incremented only once for each engine start. After the step 86, the value of the no-malfunction count is compared at step 88 with a calibration constant KNOMALF in the ROM section of the combination circuit 26. If the number of engine starts represented by the no-malfunction count is less than the calibration value, the program cycle proceeds to the decision point 80. However, if the no-malfunction count is greater than the calibration value KNOMALF, the program proceeds to the step 90 where all of the bits in the memory location MALFFLG in the nonvolatile memory 40 that are at a logic 1 level representing detected fault conditions are reset to logic 0 to thereby erase from memory all stored fault conditions. All will be described, the no-malfunction count NOMALFCT is reset to zero while malfunctions are detected. Therefore, the fault conditions stored in the nonvolatile memory location MALFFLG are erased after a period represented by a predetermined number of vehicle starts since the last detected fault condition. In this manner, old nonrecurring self-correcting faults are removed from memory and accordingly not indicated at step 74 of FIG. 5 in response to a diagnostic interrogation signal. Following the step 90, the program proceeds to the decision point 80.

Beginning at decision point 80, the program initiates a routine to determine whether a shorted coolant temperature sensor circuit exists. At decision point 80, the value of the coolant temperature read during the interrupt routine is compared with a calibration value KTMPLO representing a low value of coolant temperature. Alternatively, a filtered value of coolant temperature may be used. If the temperature is less than the calibration value KTMPLO, the program proceeds to step 92 where the time that the temperature is below the calibration parameter is compared with a calibration time KTMPL. If the temperature is below the calibration temperature for a time less than the calibration time, the program proceeds to step 94 where a low temperature counter in the microprocessor 25 representing the time that the temperature is below the calibration temperature is incremented. From step 94, the program proceeds to a decision point 96. However, if the temperature is below the calibration temperature KTMPLO for a duration greater than the calibration time period KTMPL determined at decision point 92, the program proceeds to the step 98 where the bit $b_0$ at the memory location NEWMALF in the RAM is set to a logic 1 to indicate that a short circuited coolant temperature sensor circuit is detected. From step 98, the program proceeds to the decision point 96. If at decision point 80 the temperature is determined to be greater than the calibration temperature KTMPLO, the program proceeds to the step 100 where the low temperature time counter is reset. From step 100, the program proceeds to the decision point 96.

Beginning at decision point 96, the program initiates a routine for determining whether an open temperature sensing circuit exists. At the decision point 96, the engine coolant temperature read during the interrupt routine or, alternatively, a filtered coolant temperature, is compared with a calibration value KTMPHI representing a high value of coolant temperature which is greater than the normal operating coolant temperature. If the coolant temperature exceeds the calibration parameter, the program proceeds to decision point 102 where a high temperature counter in the microprocessor 25 representing the time duration that the temperature exceeds the calibration parameter KTMPHI is compared with a calibration time KTMPH. If the temperature has not exceeded the calibration valued for a time greater than the time KTMPH, the program proceeds to the step 104 where the high temperature counter is incremented. Thereafter, the program proceeds to a decision point 106. If at decision point 102 it is determined that the temperature has exceeded the calibration temperature KTMPHI for a duration greater than the calibration time period KTMPH, the program proceeds to the step 108 where the bit $b_1$ in the RAM memory location NEWMALF is set to a logic 1 to indicate a detected open coolant temperature sensor circuit. Thereafter, the program proceeds to the decision point 106. At decision point 96, if the coolant temperature is determined to be less than the calibration value KTMPHI, the program proceeds to the step 110 where the high temperature counter is reset to 0. Following step 110, the program cycle proceeds to the decision point 106 where the routine for determining whether a failed rich or lean oxygen sensor circuit condition exists is initiated.

At step 106, the computer determines such as by sampling a closed loop flag set or reset during the interrupt routine whether or not the electronic control unit 18 is operating in a closed loop mode. If the system is operating in the closed loop mode, the program proceeds to step 112 where a running average of the value of the output of the oxygen sensor 20 is updated. From step 112 the program proceeds to decision point 114 where the average $O_2$ sensor value is compared with a calibration value KO2MIN which is less than the normal average value of the oxygen sensor signal. If the average oxygen sensor signal value is less than the calibration value KO2MIN, the program proceeds to the decision point 116 where a lean counter O2LCTR in the microprocessor 25 representing the time that the average oxygen sensor signal is less than the calibration value KO2MIN is compared with a reference value KO2T. If the time represented by the count in the counter is less than the calibration value KO2T, the program proceeds to the step 118 where the counter is incremented. Thereafter, the program proceeds to the decision point 120. If, however, at decision point 116 it is determined that the oxygen sensor average value is less than the calibration value KO2MIN for a period greater than calibration value KO2T, the program proceeds to the step 122 where the bit $b_2$ in the memory location NEWMALF in the RAM is set to a logic 1 to provide an indication of a failed lean condition. If at step 114 the average oxygen sensor signal is greater than the calibration value KO2MIN, the program proceeds to the step 124 where the counter O2LCTR is reset. Thereafter, the program proceeds to the decision point 120.

Beginning at step 120, the program determines whether a failed rich condition exists in the oxygen sensor circuit. At the decision point 120, the average oxygen sensor signal value is compared with a calibration constant KO2MAX which is greater than the normal average value of the oxygen sensor signal. If the average oxygen sensor signal is greater than the calibration value KO2MAX, the program proceeds to the decision point 126 where a counter 02RCTR in the microprocessor 25 timing the duration that the average oxygen sensor signal is greater than the calibration value KO2MAX is compared with the calibration value KO2T. If the counter value is less than the calibration time KO2T, the program proceeds to point 128 where the counter 02RCTR is incremented. However, if at step 126 it is determined that the average oxygen sensor signal is greater than the calibration value KO2MAX for a time greater than the calibration time KO2T, the program proceeds to the step 130 where the bit $b_3$ in the memory location NEWMALF in the RAM is set to indicate a detected failed rich condition in the oxygen sensor circuit.

If at step 106, it is determined that the system is not operating in closed loop so that the oxygen sensor average value relative to the calibration values is not representative of fault conditions, the program proceeds to a step 132 where the $O_2$ lean counter 02LCTR is reset. Thereafter, the program proceeds to step 134 where the $O_2$ rich counter 02RCTR is reset. Similarly, if at step 120 it is determined that the average $O_2$ sensor signal value is less than the calibration value KO2MAX, the program proceeds to the step 134 to reset the $O_2$ rich counter 02RCTR. After the steps 128, 130 and 134, the program exits the diagnostics routine at point 136 and proceeds to the malfunction indicator and memory control routine 70 illustrated in FIG. 7.

Figure 7:
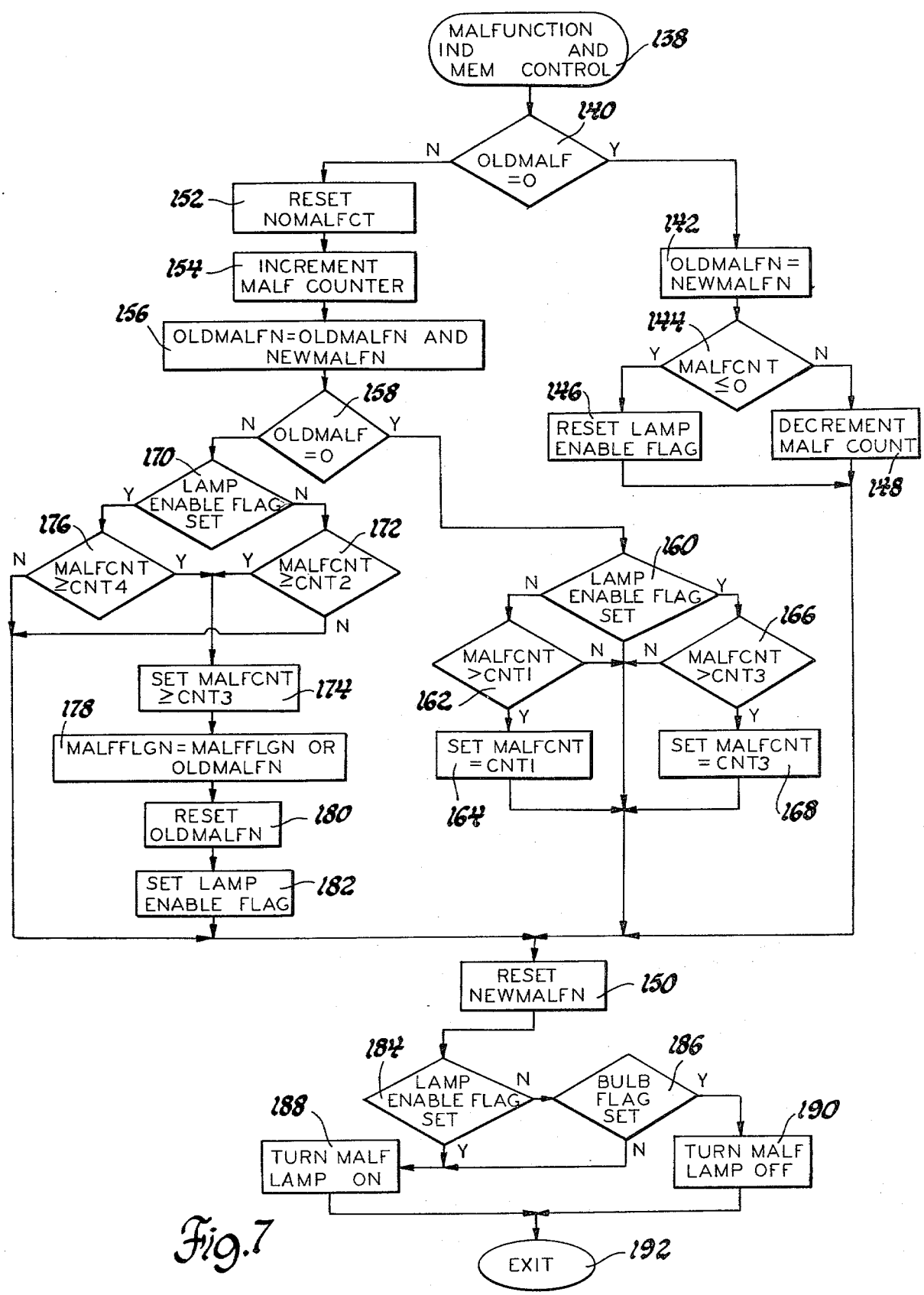

Referring to FIG. 7, the malfunction indicator and memory control routine 70 of FIG. 5 which is executed each 100 millisecond period is illustrated. In accord with this invention, this routine incorporates a single counting element (subsequently referred to as a malfunction counter) which is manipulated so as to provide for filtering of each of a number of fault conditions which may occur simultaneously and which times the minimum energization period for the malfunction lamp 23. In this respect, a fault condition is considered to have occurred and caused to be stored in the nonvolatile memory 40 if it exists continuously for a time period that is at least greater than a predetermined minimum time period. The single counter is effective to filter sensed intermittent fault conditions even when a number of sensed fault conditions occur simultaneously.

The malfunction indicator and memory control routine is entered at point 138 and proceeds to a decision point 140 where it is determined if any fault conditions are stored in the OLDMALF register. If all of the bits in the OLDMALF register are reset indicating no fault conditions stored therein, the program proceeds to a step 142 where each corresponding bit N in the memory location OLDMALF in the RAM is set to the same logic level as the corresponding bit N in the memory location NEWMALF. At this step 142, the new fault conditions detected during the diagnostics routine of FIG. 6 are stored in the OLDMALF register. This step is the only point in the routine at which faults detected during the diagnostics routine of FIG. 6 are stored in the OLDMALF memory register and this step is executed only if the OLDMALF memory register was cleared of stored fault conditions. From the step 142, the program proceeds to a decision point 144 where the count in a malfunction counter in a ROM specified RAM memory location is compared to zero. If the count in the malfunction counter is less than or equal to zero, the program proceeds to a step 146 where a lamp enable flag controlling energization of the malfunction lamp 23 is reset. However, if the count in the malfunction counter is greater than zero, the program proceeds from step 144 to step 148 where the malfunction counter is decremented. The program then proceeds to a step 150 where all of the bits in the memory location NEWMALF are reset so that only the fault conditions that are detected during the next execution of the diagnostics routine of FIG. 6 are stored in the NEWMALF memory register when the malfunction indicator and memory control routine is again executed.

If it is determined at decision point 140 that at least one of the bits in the OLDMALF register is set indicating that at least one fault condition is presently logged in the OLDMALF register, the program proceeds to a step 152 where the no-malfunction count NOMALFCT referred to in the diagnostics routine of FIG. 6 is reset. The no-malfunction count NOMALFCT is therefore continually reset while a malfunction is logged in the OLDMALF register in the RAM. Only when the OLDMALF register is cleared will the no-malfunction count be incremented to time the duration since a last detected fault condition as described relative to FIG. 6.

Following step 152, the program proceeds to a step 154 where the malfunction counter is incremented. From this step, the program proceeds to a step 156 where each bit N in the NEWMALF register is logically ANDED with the corresponding bit N in the OLDMALF register. The result of this logic combination is then set into the OLDMALF register. In this manner, if the fault condition represented by one of the bits in the OLDMALF register has corrected, resulting in the corresponding bit in the NEWMALF register being reset, the corresponding bit in the OLDMALF register is reset. The program next proceeds to a decision point 158 where it is determined if all of the fault conditions have corrected. If all of the fault conditions have corrected (all the bits in the OLDMALF register being reset) the program proceeds to a decision point 160 where the state of the lamp enable flag is sampled. If the lamp enable flag is reset (a condition representing no indication of a fault condition) the program proceeds to a decision point 162 where the malfunction count in the counter is compared with a calibration constant CNT1. If the count in the malfunction counter is less than this calibration constant, the program proceeds to the step 150 where all of the bits in the NEWMALF register are reset. However, if the count in the malfunction counter is greater than the calibration constant CNT1, the program proceeds to a step 164 where the count is set to the calibration constant CNT1. Thereafter, the program proceeds to the step 150.

If at decision point 160 in the program, it is determined that the lamp enable flag is set (a condition representing an indication of a fault condition) the program proceeds to a decision point 166 where the count in the malfunction counter is compared with a calibration constant CNT3 that establishes the minimum time for energization of the malfunction lamp 23. If the count is less than the calibration constant CNT3, the program proceeds to the step 150. However, if the count is greater than the constant CNT3, the program proceeds to the step 168 where the count in the malfunction counter is set equal to the calibration constant CNT3.

Returning to the decision point 158, if at least one of the malfunctions previously logged into the old malfunction counter has not corrected, the program proceeds from the decision point 158 to a decision point 170 where the lamp enable flag is sampled. If the lamp enable flag is reset indicating that the malfunction lamp is deenergized, the program proceeds to a decision point 172 where the count in the malfunction counter is compared with a calibration constant CNT2 that is greater than the constant CNT1 by an amount representing the time a fault condition must be continuous before it is stored in the nonvolatile memory 40 and the malfunction lamp energized to indicate a fault. For example CNT2 minus CNT1 may be 20 counts representing a 2 second time period assuming a 100 millisecond interrupt period. If the count is less than the calibration constant CNT2, the program proceeds to the step 150. However, if the count is greater than the value CNT2, the program proceeds to a step 174 where the count is set to the calibration constant CNT3 establishing the count value producing the minimum energization period of the malfunction lamp 23. The fault conditions logged in the OLDMALF register are then stored in the nonvolatile memory 40 and the lamp 23 energized as will be described.

If at decision point 170 it is determined that the lamp enable flag is set indicating that a fault condition had previously met the time criteria and the malfunction lamp was previously energized, the program proceeds to a decision point 176 where the count in the malfunction counter is compared with a calibration constant CNT4 that is greater than the constant CNT3 by the amount representing the time a fault condition must be continuous before it is stored in the nonvolatile memory 40. This difference may be 20 counts representing a 2 second time period assuming a 100 millisecond interrupt period. If the count is greater than this value, the program proceeds to the step 150. However, if the count is equal to or greater than the calibration value CNT4, the program proceeds from the decision point 176 to the step 174 where the count is set to the calibration value CNT3.

Following step 174, the program proceeds to the step 178. When the malfunction counter is incremented to a value greater than or equal to the value CNT4 determined at step 176 or is incremented to a value equal to or greater than the value CNT2 determined at step 172, a fault condition has been continuous for a minimum time period that is required to increment the malfunction counter from CNT1 to CNT2 or from CNT3 to CNT4 and the filtering time criteria for storing a detected fault condition into the nonvolatile memory 40 has been met. At the step 178 these fault conditions which are stored in the OLDMALF register are stored in the MALFFLG register in the nonvolatile memory. This is accomplished by setting each bit N in the MALFFLG register in the nonvolatile memory in accord with the logic combination MALFFLGN OR OLDMALFN where N is the bit number in the respective memory registers. Each bit in the MALFFLG memory location in the nonvolatile memory that is set in accord with this logic combination is thereafter permanently stored in the nonvolatile memory unless reset at step 90 in the routine of FIG. 6.

Following step 178, the program proceeds to step 180 where all of the bits in the OLDMALF memory location in the RAM are reset so that any fault conditions that occurred during the timing period of the fault conditions just stored in the nonvolatile memory 40 may be stored in the OLDMALF register at step 142 and then timed. Thereafter at step 182 the lamp enable flag is set to indicate that the conditions exist for energizing the malfunction lamp to indicate the occurrence of a fault condition.

Following the step 182, the program proceeds to the step 150 where each of the bits in the NEWMALF register are reset. These bits will then be set in accord with detected fault condition in the diagnostics routine 76 of FIG. 6 when next executed.

Following the step 150, the program proceeds to the decision point 184 where the state of the lamp enable flag is sampled. If this flag is reset, the program proceeds to a decision point 186 where the bulb flag 25 is sampled. As previously indicated with respect to FIG. 6 and particularly steps 78, 82 and 84, the bulb flag is reset for the predetermined calibration time period KDLAY after the engine 10 is started. During this time period, the program proceeds from the step 186 to the step 188 where the malfunction lamp is energized via the output discrete section of the circuit 36 of FIG. 2. However, after the expiration of the predetermined time period KDLAY, the bulb flag is set at step 84 of FIG. 6 so that at step 186 the program proceeds to the step 190 where the malfunction lamp is deenergized. Returning to step 184, if it is determined that the lamp enable flag was set at step 182, the program proceeds to the step 188 where the malfunction lamp is energized to indicate to the vehicle operator that a fault condition has occurred. From each of the steps 188 or 190, the program exits the malfunction indicator and memory control routine at step 192.

The malfunction indicator and memory control routine of FIG. 7 generally operates as follows. The malfunction counter is incremented at step 154 each 100 milliseconds, in this embodiment, after a malfunction is logged in the OLDMALF register in the RAM and decremented at step 148 each 100 milliseconds when the OLDMALF register is cleared representing no fault conditions existing.

Fault conditions detected during the diagnostics routine of FIG. 6 and set in the corresponding bit locations in the NEWMALF register in the RAM can be logged into the OLDMALF register at step 142 (and thereafter timed) only after all of the fault conditions logged previously stored in the OLDMALF register are cleared either at step 156 as a result of the fault conditions being corrected or at step 180 where the fault conditions logged in the OLDMALF register are reset after having met the time criteria and stored in the MALFFLG register in the nonvolatile memory 40.

Once a fault condition is stored in the OLDMALF register, it is then stored in the MALFFLG register in the nonvolatile memory 40 only if it remains stored in the OLDMALF register continuously for the time required for the malfunction counter to be incremented from CNT1 to CNT2 (if the malfunction lamp is deenergized) or for the time required for the malfunction counter to count from the value CNT3 to the value CNT4 (if the malfunction lamp is energized). Typically, these times are equal and may be in the order of two seconds. This timing is accomplished by initializing the count in the malfunction counter to the value CNT1 at step 164 when the count in the malfunction counter is intermediate the value CNT1 and CNT2 or to the value CNT3 at step 166 when the count in the malfunction counter is intermediate the values CNT3 and CNT4 each time all fault conditions are corrected as detected at step 158 and then storing the fault conditions stored in the OLDMALF register in the MALFFLG register in the nonvolatile memory 40 when the count in the malfunction counter equals the value CNT2 or the value CNT4.

The malfunction lamp is energized when the malfunction counter is incremented to the value CNT2 in response to a malfunction (or malfunctions) being continuous from the value CNT1 and deenergized when the malfunction counter is decremented to zero. The value CNT3 establishes a minimum time that the malfunction lamp 23 is energized after a fault condition is stored in the nonvolatile memory 40 since each time a fault condition is stored in the nonvolatile memory or when all fault conditions are corrected while the malfunction lamp is energized, the malfunction counter is preset to the count CNT3 at step 174 or step 166. After all of the fault conditions are corrected after the malfunction lamp 23 is energized, the malfunction counter is decremented from the value CNT3 each 100 milliseconds at step 148 until it reaches zero at which time the malfunction lamp 23 is then deenergized. The value of CNT3 may typically provide a minimum time of 8 seconds for maintaining the malfunction lamp 23 energized.

If a second fault condition should occur while the routine of FIG. 7 is timing a first fault condition, when the first fault condition is stored in the nonvolatile memory 40 and the malfunction counter is set to CNT3, the second fault condition is then stored in the OLDMALF register and timed. If it also meets the time criteria, it is then stored in the nonvolatile memory.

FIG. 9a illustrates the operation of the malfunction indicator and memory control routine in response to a single continuous fault A. FIG. 9b illustrates the operation of the routine where the malfunction counter provides filtering for two intermittent faults A and B and provides timing for maintaining the malfunction lamp 24 energized for a predetermined time after both fault conditions correct.

From the foregoing, it can be seen that a plurality of timing functions are provided by a single timing element which provides for filtering of each of a number of malfunctions which may occur simultaneously and which timing element further provides for timing of a minimum duration for the malfunction lamp energization.

The foregoing description of a preferred embodiment for the purposes of illustrating the invention is not to be considered as limiting or restricting the scope of the invention since many modifications may be made by the exercise of one skilled in the art.

The embodiments of the invention in which an exclusive property or privilege is claimed are defined as follows:

1. A diagnostic monitoring system for monitoring predetermined parameters in a motor vehicle comprising, in combination:

fault indicating means, the fault indicating means having a first state indicating a fault-free condition and a second state indicating a fault condition;

a temporary storage register for storing fault conditions;

counting means effective to store a count;

means effective to detect fault conditions in the predetermined parameters; and means effective to (a) store detected fault conditions in the temporary storage register only when said temporary storage register is cleared of all stored fault conditions, (b) clear each terminated fault condition from the temporary storage register at the time said fault condition terminates, (c) recurrently increment the count in the counting means during the period that a malfunction is stored in the temporary storage register, (d) set the fault indicating means to the second state to provide an indication of a fault condition when the count in the counting means attains a first predetermined count, and (e) preset the count in the counting means to a second predetermined count that is less than the first predetermined count when the temporary storage register is cleared of all storage malfunctions when the count is intermediate the first and second counts, the difference between the first and second counts establishing a predetermined minimum time period required for a fault condition to exist before the fault indicating means is set to the second state to indicate a fault condition.

2. A diagnostic monitoring system for monitoring predetermined parameters in a motor vehicle comprising, in combination:

a nonvolatile memory nonvolatile as to motor vehicle operation;

a temporary storage register for storing fault conditions;

counting means effective to store a count;

means effective to detect fault conditions in the predetermined parameters; and means effective to (a) store detected fault conditions in the temporary storage register only when said temporary storage register is cleared of all stored fault conditions, (b) clear each terminated fault condition from the temporary storage register at the time said fault condition terminates, (c) recurrently increment the count in the counting means during the period that a fault condition is stored in the temporary storage register, (d) store the fault conditions stored in the temporary storage register in the nonvolatile memory and clear the fault conditions stored in the temporary storage register when the count in the counting means attains a first predetermined count, and (e) preset the count in the counting means to a second predetermined count that is less than the first predetermined count when the count in the counting means attains the first predetermined count or when the temporary storage register is cleared of all stored fault conditions, the difference between the first and second counts establishing a predetermined minimum time period required for all fault conditions to be continuous before being stored in the nonvolatile memory.

3. A diagnostic monitoring system for monitoring predetermined parameters in a motor vehicle comprising, in combination:

a nonvolatile memory nonvolatile as to motor vehicle operation;

fault indicating means, the fault indicating means having a first state indicating a fault-free condition and a second state indicating a faulted condition;

a temporary storage register for storing fault conditions;

counting means effective to store a count;

means effective to detect fault conditions in the predetermined parameters; and means effective to (a) store detected fault conditions in the temporary storage register only when said temporary storage register is cleared of all stored fault conditions, (b) clear each terminated fault condition from the temporary storage register at the time said fault condition terminates, (c) recurrently increment the count in the counting means during the period that a fault condition is stored in the temporary storage register and recurrently decrement the count in the counting means when the temporary storage register is cleared of all stored fault conditions, (d) set the fault indicating means to the second state to provide an indication of a faulted condition when the count in the counting means attains a first predetermined count that is greater than a second predetermined count, (e) store the fault conditions stored in the temporary storage register in the nonvolatile memory, clear the fault conditions stored in the temporary storage register and preset the count in the counting means to a third count greater than the first count when the count in the counting means attains the first count or a fourth count greater than the third count; (f) preset the count in the counting means to the second count when the temporary storage register is cleared of all stored malfunctions while the count is intermediate the first and second counts; (g) preset the count in the counting means to the third count when the temporary storage register is cleared of all stored malfunctions while the count is intermediate the third and fourth counts; and (h) set the fault indicating means to the first state to indicate a fault-free condition when the count in the counting means is decremented to a predetermined fifth count equal to or less than the second count, the difference between the first and second counts and the third and fourth counts being equal and establishing a predetermined minimum time period required for fault conditions to be continuous before being stored in the nonvolatile memory and before setting the fault indicating means to its second state to indicate a fault condition and the difference between the third and fifth counts establishing a predetermined minimum time period for the fault indicating means to be in the second state.

* * * * *